United States Patent [19]

Iwase et al.

[11] 4,169,370
[45] Oct. 2, 1979

[54] METHOD FOR EVALUATING SURGES OF MOTOR VEHICLES

[75] Inventors: Hirohide Iwase, Mishima; Yukio Maeda, Susono; Tatsuo Sugitani, Mishima, all of Japan

[73] Assignee: Toyota Jidosha Kogyo Kabushiki Kaisha, Aichi, Japan

[21] Appl. No.: 901,813

[22] Filed: May 1, 1978

[30] Foreign Application Priority Data

May 18, 1977 [JP] Japan .................................. 52/57337

[51] Int. Cl.² ........................................... G01M 15/00
[52] U.S. Cl. ....................................................... 73/116
[58] Field of Search ..................... 73/116, 118, 117.3, 73/659, 660

[56] References Cited

U.S. PATENT DOCUMENTS

| 3,972,230 | 8/1976 | Hanson et al. | 73/116 |
| 4,083,234 | 4/1978 | Aono et al. | 73/116 |

OTHER PUBLICATIONS

"La Mesure Objective du Confort Vibratoire a Bord des Camions", Ingenieurs de l'automobile, Apr. 1972.
"Measuring Vehicle Driveability" by R. L. Everett, SAE Automotive Engineering Congress, Jan. 11-15, 1971.

Primary Examiner—Jerry W. Myracle
Attorney, Agent, or Firm—Stevens, Davis, Miller & Mosher

[57] ABSTRACT

Root mean squares are obtained for the amplitude produced within a given period of time in the surges within such frequency scope as allows the human sense to perceive them easily among the surges of a variety of frequencies which occur in a motor vehicle during running. The magnitude of the squares obtained is substantially coincident with that of the surges felt by the human sense.

3 Claims, 5 Drawing Figures

METHOD FOR EVALUATING SURGES OF MOTOR VEHICLES

The present invention relates to a method for evaluating surges produced in a motor vehicle in a quantitative manner. Although the judgement of the drivability of vehicles, especially motor vehicles, is performed by the human sense, there is considerable divergence in the evaluations by the human sense, especially about surges (longitudinal vibrations of motor vehicles), acceleration, etc. because of such factors as individual differences among those conducting evaluation, difference of mental and physical conditions among them due to differences of environments in which the evaluations are made, or the like. Also, it is difficult to reproduce the conditions under which evaluation has been made for surges, or the like. So far, many attempts have been made to obtain a method of evaluating the surge phenomenon in a quantitative manner, but it has been difficult to obtain such quantitative evaluating method as coincides with the human sense for the surge phenomenon.

An object of this invention is to remove the drawbacks involved in the evaluation of surges of motor vehicles by the human sense and provide a method for evaluating surges of motor vehicles in an easy, objective and quantitative manner.

Another object of this invention is to provide a method for evaluating surges of motor vehicles which does not produce any disparity in the values of evaluation due to individual differences among those conducting evaluation or differences of mental and physical conditions among them.

A further object of this invention is to provide a method for evaluating the discomfort which passengers feel due to the vibrations in six directions (i.e., longitudinal, transversal, lateral vibrations, rolling, yawing and pitching) caused in all kinds of conveyances for passengers, in an objective manner in the same way as the human sense properly does.

Still further objects of this invention will become apparent upon a reading of the following detailed description of this invention and annexed drawings in which.

Before going into details for an embodiment of this invention, a brief explanation is to be given to the surge phenomenon. The term "surge phenomenon" is herein used to mean the longitudinal vibrations produced in a motor vehicle. The surges perceivable by the human sense are those of frequencies of 10 Hz or less. The surge phenomenon is caused by periodical fluctuations of torque due to changes of the combustion condition in the engine, a lack of uniformity in the dimensions and stiffness of the tires, external forces periodically applied to the vehicle due to, e.g., a jolting of the vehicle along rough roads, or the like and the surge phenomenon is the sympathetic vibrations of the vehicle due to the vibrations produced by periodical fluctuations of torque or external forces as mentioned above. The frequency of amplitude in the surge phenomenon is substantially in accordance with the normal distribution.

Figure 1:
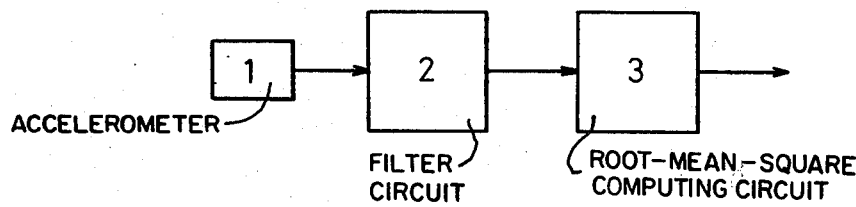
FIG. 1 illustrates an arrangement used in carrying out this invention, comprising a filter section designed to allow surges to pass therethrough in a selective manner and a circuit adapted to obtain the root mean squares of the surges which have passed through the filter section.

Referring now to FIG. 1, an accelerometer 1 attached to a motor vehicle changes variations of the longitudinal acceleration of the vehicle into voltage signals indicating amplitude and frequency and inputs the signals to a filter circuit 2. The filter circuit 2 is adapted to allow those signals within such frequency scope as allows the human sense to perceive them easily to pass therethrough, but attenuate those signals within such frequency scope as makes it difficult for the human sense to perceive them. The signals which have passed through the filter circuit 2 are then input to a root-mean-square computing circuit 3 which is designed to figure out the root mean square of the amplitude of the signals produced within a given period of time.

Figure 2:
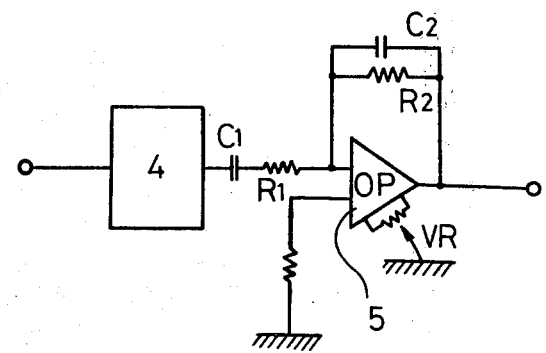
FIG. 2 illustrates the filter section shown in FIG. 1 in detail.

FIG. 2 shows the filter circuit 2 in detail. The filter circuit 2 includes a band pass filter 4 which is adapted to allow those signals within such frequency scope as allows the human sense to perceive them easily to pass therethrough, but attenuate those signals within such frequency scope as makes it difficult for the human sense to perceive them. Specifically speaking, in the embodiment shown in the drawings, the signals allowed to pass through the band pass filter 4 are of a frequency of 4 Hz or thereabouts. The signals which have passed through the band pass filter 4 are input through a condenser $C_1$ and a resistor $R_1$ to the input terminal of an operational amplifier 5 which is provided with a variable resistance VR for adjusting the offset voltage. A condenser $C_2$ and a resistor $R_2$ form a feedback circuit. The operational amplifier 5, condensers $C_1$ and $C_2$ and resistors $R_1$ and $R_2$ form a differentiation circuit which functions to work out the amplitude of the signals which have passed through the band pass filter 4.

Figure 3:
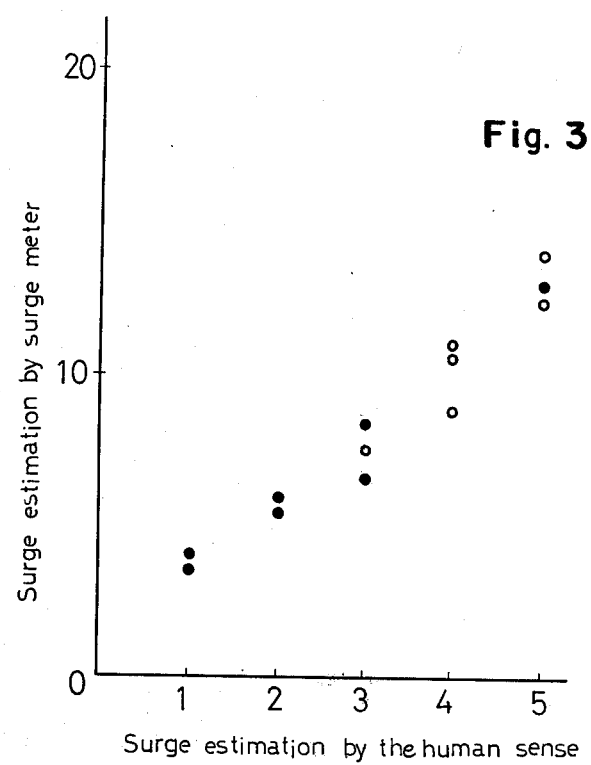
FIG. 3 shows the relation between the estimated values of surges obtained according to this invention and those according to the human sense.
Figure 4:
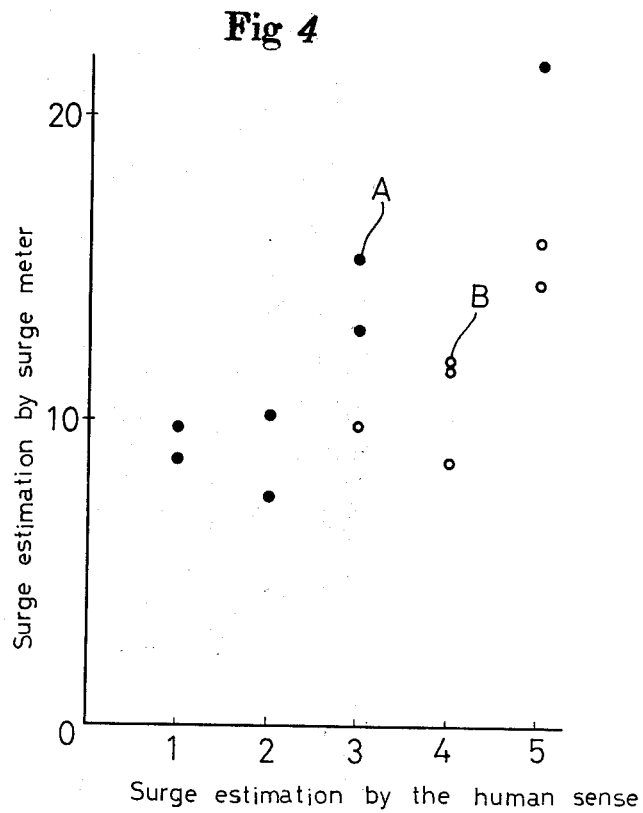
FIG. 4 shows the relation between the estimated values of surges obtained by using the conventional device and those according to the human sense.
Figure 5:
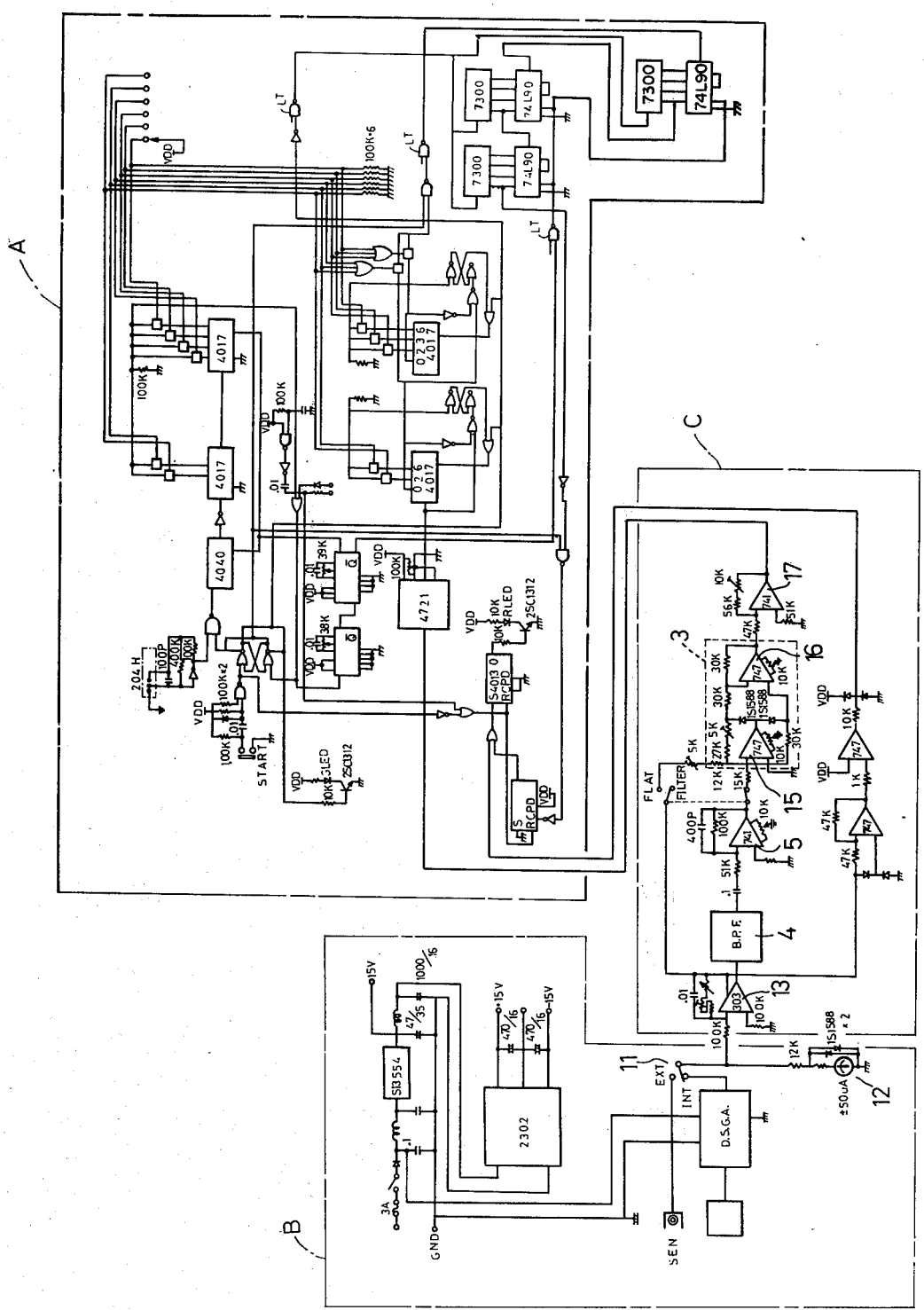
FIG. 5 illustrates the electric circuit of a surge meter used in carrying out this invention.

Referring to FIG. 5, there is illustrated a circuit or a surge meter including the band pass filter 4, the differentiation circuit and root-mean-square computing circuit 3. FIG. 3 shows surge values (root mean squares of the amplitude) estimated by the use of the surge meter of FIG. 5 by the ordinate and those estimated by the human sense by the abscissa, while FIG. 4 shows surge values (root mean squares of the amplitude) estimated by the use of a surge meter including the conventional band pass filter which allows the surges of frequencies of 2 to 10 Hz to pass therethrough by the ordinate and those estimated by the human sense by the abscissa. In FIGS. 3 and 4, the abscissas have the following meanings:

1 ... Not objectionable
2 ... Not so objectionable
3 ... Slightly objectionable
4 ... Objectionable
5 ... Very objectionable The estimations in FIGS. 3 and 4 were made for the input signals produced in the same surge phenomenon.

It can be seen in FIG. 3 that the values estimated by the surge meter according to the invention are substantially coincident with those estimated by the human sense, that is, the higher the values by the surge meter, the more objectionable the human sense feels. FIG. 4, however, does not show such coincidence as can be seen, for example, in that the surge represented by point A is higher than that represented by point B in the value estimated by the surge meter, yet the former is less objectionable to the human sense than the latter. It is assumed that the reason for this discordance is that the frequency of the main amplitude produced in the surge represented by point A is less perceivable than that of the main amplitude produced in the surge represented by point B.

As understood from FIG. 3, it is possible according to the invention to evaluate surges produced in motor vehicles in an objective and quantitative manner as the human sense properly does. It is also to be noted that the filter circuit according to this invention can be inexpensively manufactured since it is of simple construction as shown in FIG. 2 and that the surge meter provided with such circuit is very useful in conducting the vibration analysis for motor vehicles or the like.

Reference is now made to the construction and operation of the surge meter shown in FIG. 5. This surge meter comprises an indication circuit A of the well known type in the art, a circuit B and a circuit C including the band pass filter 4, differentiation circuit, root-mean-square circuit 3 hereinabove described for producing estimated values of the surges. The circuit B comprises a power source, acceleration detecting sensor SEN, standard signal generator DSGA adapted to give standard signals to correct estimated values and level meter 12. In the circuit B, input signals are turned into an output from a terminal EXT of the acceleration detecting sensor SEN and an output from a terminal INT of the standard signal generator DSGA by a changeover switch 11 and their values are compared with each other by the level meter 12 to adjust the signals from the sensor SEN to the suitable level. The signals from the sensor SEN are then amplified by an operational amplifier 13 up to the level to enable the band pass filter 4 to function. A variable resistance is connected to an output side and a non-inverted input terminal of the operational amplifier 13 to adjust the amplification of the signals. Amplified at the operational amplifier 13, the signals then enter into the band pass filter 4, which allows those signals within such frequency scope as allows the human sense to perceive them easily to pass therethrough, yet attenuates those signals within such frequency scope as makes it difficult for the human sense to perceive them. The signals which have passed through the band pass filter 4 are differentiated by the differentiation circuit comprising the operational amplifier 5, condensers $C_1$ and $C_2$ and resistors $R_1$ and $R_2$ and operational amplifiers 15 and 16 of the root-mean-square computing circuit 3 function to make the signals from the differentiation circuit into those signals of the levels corresponding to the root mean squares of the amplitude of the signals produced within a given period of time. The signals are then amplified up to the suitable level at an operational amplifier 17 and input to the indication circuit A.

It should be understood that the description made herein is of a preferred embodiment of this invention, and that certain modifications and changes therein may be made by those skilled in the art.

What we claim is:

1. Method for evaluating surges of motor vehicles comprising calculating the root mean squares of the amplitude produced within a given period of time in the surges within such frequency scope as allows the human sense to perceive them easily among the surges having a variety of frequencies which are produced during running of a motor vehicle.

2. The invention as defined in claim 1 wherein said frequency scope is 4 Hz and thereabouts.

3. The invention as defined in claim 1 wherein said surges within such frequency scope as allows the human sense to perceive them easily are allowed to pass through a filter, yet those surges within such frequency scope as makes it difficult for the human sense to perceive them are attenuated by said filter.

* * * * *